UNITED STATES PATENT OFFICE.

GEORGE E. RIECK, OF BREMERTON, WASHINGTON.

PAINT FOR COATING METALLIC SURFACES SUBJECT TO HIGH TEMPERATURES.

1,227,071.   Specification of Letters Patent.   Patented May 22, 1917.

No Drawing.   Application filed April 7, 1915. Serial No. 19,772.

*To all whom it may concern:*

Be it known that I, GEORGE E. RIECK, a citizen of the United States of America, residing at Bremerton, in the county of Kitsap and State of Washington, have invented certain new and useful Improvements in Paint for Coating Metallic Surfaces Subject to High Temperatures, of which the following is a specification.

This invention relates to a paint composition and has for its object the production of a simple and efficient composition which will produce a paint suitable for applying to metal which may be exposed to heat.

Another object of this invention is the production of a simple and efficient composition which will not blister when applied to a metallic surface and subjected to high temperatures.

A still further object of this invention is the production of a simple and efficient method for producing the composition.

The paint consists of 1 gallon of japan to one and one-half pounds of powdered aluminum thoroughly mixed, and clabber resulting from one gallon of cow's milk to one and one-half pounds of powdered aluminum thoroughly mixed. The cow's milk is left to stand for two days in order to allow the milk to turn to clabber whereupon the water and cream is removed from the clabber so as to eliminate all substances that would be likely to cause the paint to blister when subjected to heat. One and one-half pounds of powdered aluminum are then mixed with the clabber. The two mixtures above described, to wit: japan and aluminum, and clabber and aluminum are then thoroughly mixed together, and the paint is ready for use. The japan which is used in the mixture consists of one and one-fourth pounds of rosin to one gallon of gasolene or distillate or benzin or kerosene. It is preferable, however, to use the composition of one and one-fourth pounds of rosin to one gallon of gasolene thoroughly mixed together. The aluminum which is used is ground into a powder form.

It is essential that the milk should be left to stand so that the cream may be separated therefrom by allowing the milk to turn to a clabbered form. What should be understood by clabbered form is that form which the milk takes after having stood for considerable time and soured, wherein the greasy portions of the milk will rise to the top of the receptacle in which the milk is placed and allow the water to remain near the bottom thereof. The milk in this condition is sometimes known as bonny-clabber, and care should be taken that the milk has reached this stage before attempting to make the desired mixture. The water must then be removed, which may be easily accomplished owing to the condition of the milk, and the remaining thick milk portion known as clabber minus the cream and water is then mixed thoroughly with the aluminum as stated above.

The object of removing the cream and water from the clabbered milk is to rid the substance of any portions which would be likely to cause the paint to blister when subjected to high degrees of temperature.

It is desirous to have the mixture stand for approximately two days for the purpose of getting the mixture in proper condition for placing the same into vessels for sale, such as cans and the like, and by allowing the mixture to stand the paint will have a better sticking quality than if used immediately without allowing the mixture to stand.

From the foregoing description it will be seen that a very simple and efficient composition has been produced for perfecting a paint suitable for being used upon metal surfaces which are subjected to unusually high degrees of temperature.

It should be understood that it is essential to mix the clabber with the aluminum in order that a paste-like substance may be produced. By having the clabber and aluminum mixed, prior to mixing the clabber with the japan, the different substances may become more thoroughly and easily united than if all the substances were assembled in one step.

Having thus described the invention what is claimed as new is:—

1. A paint for coating metallic surfaces subject to high temperatures comprising the reaction products of japan, powdered aluminum, and clabber resulting from soured milk.

2. A paint for coating metallic surfaces subject to high temperatures comprising the reaction products of one gallon of japan, three pounds of powdered aluminum, and clabber resulting from one gallon of soured cow's milk.

In testimony whereof I hereunto affix my signature in presence of two witnesses.

GEORGE E. RIECK.

Witnesses:
MARION GARLAND,
J. E. JOHNSON.